United States Patent [19]

Tzikas

[11] 4,284,770
[45] Aug. 18, 1981

[54] PROCESS FOR THE MANUFACTURE OF VAT DYES

[75] Inventor: Athanassios Tzikas, Pratteln, Switzerland

[73] Assignee: Ciba-Geigy Corporation, Ardsley, N.Y.

[21] Appl. No.: 36,622

[22] Filed: May 7, 1979

[30] Foreign Application Priority Data

May 17, 1978 [CH] Switzerland ................. 5342/78

[51] Int. Cl.³ ............... C07D 251/48; C07D 401/12; C07D 403/12; C07D 413/12
[52] U.S. Cl. ............................ 544/187; 544/188; 544/189; 544/207
[58] Field of Search .............. 544/187, 188, 189, 207

[56] References Cited

U.S. PATENT DOCUMENTS 3,483,320  12/1969  Hari et al. .................... 544/187
3,935,208  1/1976  Altermatt .................... 544/189

FOREIGN PATENT DOCUMENTS 2403879  8/1974  Fed. Rep. of Germany ........... 544/187
887753  1/1962  United Kingdom .................... 544/187

*Primary Examiner*—John M. Ford

*Attorney, Agent, or Firm*—Edward McC. Roberts; John P. Spitals

[57] ABSTRACT

A process for the manufacture of vat dyes of the formula $$A_1-NH-C\underset{N}{\overset{N}{\underset{\|}{=}}}C-NH-A_2 \quad (1)$$
$$\phantom{A_1-NH-C}\underset{H}{\overset{|}{C}}$$

wherein each of $A_1$ and $A_2$ independently is a vattable radical, which comprises reacting compounds of the formula $$A_1-NH-C\underset{N}{\overset{N}{\underset{\|}{=}}}C-NH-A_2 \quad (2)$$
$$\phantom{A_1-NH-C}\underset{X}{\overset{|}{C}}$$

wherein X is halogen and $A_1$ and $A_2$ are as defined for formula (1), in a basic medium with hydrazine compounds.

7 Claims, No Drawings

PROCESS FOR THE MANUFACTURE OF VAT DYES

The present invention provides a process for the manufacture of vat dyes of the formula

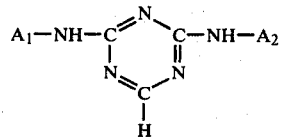   (1)

wherein each of $A_1$ and $A_2$ independently is a vattable radical, which comprises reacting compounds of the formula

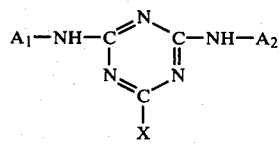   (2)

wherein X is halogen and $A_1$ and $A_2$ are as defined for formula (1) above, in a basic medium with hydrazine compounds.

The above reaction is carried out in aqueous or aqueous-organic medium. Particularly suitable organic media are solvents which are inert under the reaction conditions and are readily miscible with water. The reduction is preferably carried out in mixtures of water and organic protic solvents. Examples of suitable organic protic solvents are: methanol, ethanol, propanol, isopropanol, n-butanol, isobutanol, benzyl alcohol, diethylamine, triethylamine, aniline. Preferably the reaction is carried out in mixtures of water and methanol or water and ethanol and, in particular, in pure aqueous solution.

The reaction is carried out in a basic medium, preferably a strong basic medium, for example at a pH value of at least 10. The pH value is preferably adjusted by addition of an alkali metal hydroxide, in particular sodium hydroxide or potassium hydroxide.

The reaction temperature can vary in any range compatible with the reactants, preferably between room temperature and the boiling temperature of the reaction mixture. It is particularly advantageous to begin the reaction at room temperature and to bring it to completion by raising the temperature to near that of the boiling range. An advantageous temperature range for the reaction is that between about 80° C. and 105° C.

The reaction of this invention consists of a reductive removal of the halogen atom in the starting compound of the formula (2).

Reducing agents used in the process of the invention are hydrazine or hydrazine derivatives, for example: hydrazine, hydrazine hydrate, methyl hydrazine, ethyl hydrazine, phenyl hydrazine, hydrazinium chloride, hydrazinium dichloride, hydrazinium sulfate, hydrazinium bromide, benzenesulfonyl hydrazide. The preferred reducing agent is hydrazine hydrate.

The halogen atom X in the starting compounds of the formula (2) is chlorine, bromine or fluorine.

Eligible vattable radicals $A_1$ and $A_2$ in the starting compounds of the formula (2) are radicals of polycyclic quinoid compounds, for example anthrapyrimidines, anthrypyridones, anthrypyrimidones, azabenzanthrones, benzanthrones, anthranthrones, anthrimides, anthrimidecarbazoles, isothiazole-anthrones, pyrazole-anthrones, pyrimidanthrones, anthraquinone compounds which are derived from 9,10-dioxoanthracene and optionally contain further fused carbocyclic and heterocyclic rings, such as quinazoline-anthraquinones, oxazole-anthraquinones, thiazole-anthraquinones, oxadiazole-anthraquinones, pyrazole-anthraquinones, pyrazino-anthraquinones, and, preferably, anthraquinones bonded in the 1- or 2-position as well as 3,4-phthaloylacridones bonded in the 2- or 8-position. All these radicals can carry the customary substituents for vat dyes. Examples of such substituents are: halogen atoms, in particular chlorine, fluorine, or bromine, alkyl, alkoxy, aryl, aryloxy, aralkyl, aralkoxy, arylamino, alkylmercapto, arylmercapto, cyano and thiocyano groups. Throughout this specification, the term "alkyl" refers in particular to radicals with 1 to 4 carbon atoms, and "aryl" denotes in particular radicals such as phenyl, tolyl, chlorophenyl, methoxyphenyl, or naphthyl radicals, and "aralkyl" means in particular the benzyl radical. Particularly important substituents are moreover acyl and acylamino groups. The term "acyl" comprises above all radicals of aromatic carboxylic or sulfonic acids, in particular those of the benzene series, or low molecular alkanoyl or alkylsulfonyl radicals (i.e. which contain from 1 to 4 carbon atoms), e.g. the acetyl, benzoyl, p-chlorobenzoyl, p-phenylbenzoyl, benzenesulfonyl or p-toluenesulfonyl radical, also low molecular carbalkoxy radicals and sulfonamide or carboxy amide groups the nitrogen atom of which can be substituted by alkyl or aryl radicals, e.g. the carboethoxy, carbamoyl or sulfamoyl radical.

The vattable radicals $A_1$ and $A_2$ in the starting compounds of the formula (2) can be similar or different.

The starting materials are preferably compounds of the formula (2), wherein X is halogen and each of $A_1$ and $A_2$ independently is a vattable radical containing 3 to 7 condensed rings.

A further preferred embodiment of the invention comprises starting from compounds of the formula (2), wherein X is chlorine and each of $A_1$ and $A_2$ independently is a substituted or unsubstituted anthraquinone radical which is bonded in the 1- or 2-position, or a substituted or unsubstituted 3,4-phthaloylacridone radical which is bonded in the 2- or 8-position.

The most preferred starting materials are compounds of the formula (2), wherein $A_1$ and $A_2$ are different vattable radicals.

The starting compounds of the formula (2) can be obtained in known manner by condensing a trihalogeno-s-triazine of the formula

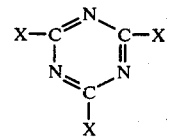   (3)

wherein X is halogen, with vattable amines of the formulae $A_1-NH_2$   (4)

and $A_2-NH_2$   (5), wherein $A_1$ and $A_2$ have the above meanings. The vattable amines of the formulae (4) and (5) can be similar or different.

Eligible triahalogeno-s-triazines of the formula (3) are, in particular, cyanuric chloride, cyanuric fluoride and cyanuric bromide.

Illustrative examples of amines of the formulae (4) and (5) are:

1-aminoanthraquinone,
1-amino-4-methoxyanthraquinone,
1-amino-4-acetylaminoanthraquinone,
1-amino-4-benzoylamino-anthraquinone,
1-amino-4-(p-toluylsulfonylamino)-anthraquinone,
1-amino-4-(p-chlorobenzoylamino)-anthraquinone,
1-amino-4-anilido-anthraquinone,
1-amino-4-[p-(N,N-dimethylsulfamoyl)-benzoylamino]anthraquinone,
1-amino-4-phenylmercapto-anthraquinone,
1-amino-4-(4'-phenyl-benzoylamino)-anthraquinone,
1-amino-4-chloroanthraquinone as well as the corresponding 1-aminoanthraquinones which are substituted in 5- or 8-position instead of in 4-position, 2-amino-anthraquinone,
1-amino-2-methyl-anthraquinone,
1-amino-3-chloro-anthraquinone,
1-amino-6,7-dichloro-anthraquinone,
1-amino-6-phenylmercapto-anthraquinone,
1-amino-7-phenylmercapto-anthraquinone,
1-amino-6-chloro-7-phenylmercapto-anthraquinone,
1-amino-7-chloro-6-phenylmercapto-anthraquinone,
1,4-diamino-2-acetyl-anthraquinone,
2-amino-3-chloro-anthraquinone,
2-amino-4-chloro-anthraquinone,
1-amino-2-chloro-anthraquinone,
1-amino-6-chloro-anthraquinone,
1-amino-3-chloro-6-methyl-anthraquinone,
1-amino-2-methyl-3-chloro-anthraquinone,
1-amino-7-chloro-anthraquinone,
2-amino-3,4-phthaloylacridone,
2-amino-6- or 7-chloro-3,4-phthaloylacridone,
2-amino-6-trifluoromethyl-3,4-phthaloylacridone,
2-amino-5,7-dichloro-3,4-phthaloylacridone,
2-amino-1,7-dichloro-3,4-phthaloylacridone,
8-amino-5-chloro-3,4-phthaloylacridone,
7-amino-1,2-benzo-5,6-phthaloylacridone, aminoanthanthrone,
5-aminoisothiazolanthrone,
4-amino-1,1'-dianthrimide-2,2'-carbazole,
4,4'-diamino-1,1'-dianthrimide-2,2'-carbazole,
bz-1-amino-benzanthrone,
bz-1-amino-2-methyl-benzanthrone,
1-phenyl-5-amino-anthrapyrimidine.

It is a further object of the invention to provide vat dyes of the formula (1), wherein $A_1$ and $A_2$ are different vattable radicals.

As regards the constitution of the vattable radicals $A_1$ and $A_2$, the same applies as has been stated above in the definition of the starting compounds of the formula (2).

Preferred vat dyes of the formula (1) are those wherein each of $A_1$ and $A_2$ is a vattable radical containing 3 to 7 condensed rings and wherein the radicals $A_1$ and $A_2$ are different.

The most preferred vat dyes are those of the formula (1), wherein each of $A_1$ and $A_2$ is a substituted or unsubstituted anthraquinone radical which is bonded in the 1- or 2-position, or a substituted or unsubstituted 3,4-phthaloylacridone radical which is bonded in the 2- or 8-position, and wherein the radicals $A_1$ and $A_2$ are different.

The vat dyes of the formula (1), wherein $A_1$ and $A_2$ are different vattable radicals, are obtained as described above.

The vat dyes of the formula (1) obtained by the process of the present invention can be isolated from the reaction mixture in a manner which is known per se.

The products according to the invention are suitable for dyeing and printing the most varied materials, in particular for dyeing and printing fibres made from natural or regenerated cellulose in the presence of a reducing agent, e.g. dithionite.

The dyeings which are obtained are characterised by good levelling properties. The fastness properties are in general very good, in particular the fastness to light, water, chlorine, and to boiling soda. The new dyes reserve polyester fibres well or stain them tone in tone, which makes them suitable for dyeing fibre blends in admixture with disperse dyes.

The new dyes can also be used as pigments for the most diverse forms of pigment application, e.g. in finely divided form for colouring rayon and viscose, or cellulose ethers or esters, or polyamides or polyurethanes or polyesters in the spinning melt, as well as for the production of coloured lacquers or lake formers, coloured solutions or products from acetyl cellulose, nitrocellulose, coloured natural resins or artificial resins, such as polyaddition resins or condensation resins, e.g. aminoplasts, alkyd resins, phenolic plastics, polyolefins, such as polystyrene, polyvinyl chloride, polyethylene and polypropylene, polyacrylonitrile, rubber, casein, silicone and silicone resins. Furthermore, it is also possible to use them with advantage in the manufacture of coloured pencils, cosmetic preparations, or laminated sheets.

Compared with the prior art, namely German Offenlegungsschrift No. 2,403,879, the process of the present invention possesses an advantage. The publication in question discloses a process for the manufacture of vat dyes of the formula (1), which comprises condensing either haloanthraquinones with 2,4-diamino-6-hydrogen-s-triazines or aminoanthraquinones with 2,4-dihalogeno-6-hydrogen-s-triazines.

Starting compounds of the formula (2) are used in the process of the present invention. These starting compounds are obtained as described above by condensing trihalogeno-s-triazines of the formula (3) with vattable amines of the formulae (4) and (5). Because of the very different reactivity of the two halogen atoms removed successively from the trihalogeno-s-triazine, it is possible to effect condensation with two different amines in succession and thus to obtain "unsymmetrical" starting compounds of the formula (2) and vat dyes of the formula (1). Both amino groups at the triazine ring of the diaminotriazines used in the process of the prior art have virtually the same strong reactivity, so that a selective condensation is not possible. Although the dihalotriazines also used in the prior art can be condensed selectively with aminoanthraquinones, the starting dihalotriazine is very difficult to obtain and therefore technically scarcely available. Vat dyes of the formula (1), wherein $A_1$ and $A_2$ are different radicals, are therefore of particular importance, because only with them can specific shades, such as olive green and brown, be obtained.

The invention is illustrated by the following Examples, in which the parts and percentages are by weight unless otherwise indicated. The relationship of parts by weight to parts by volume is the same as that of grams to milliliters.

EXAMPLE 1

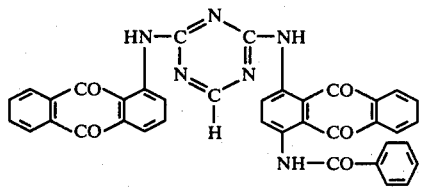

5 parts of 2-anthraquinonyl-(1')-amino-4-(4"-benzoylaminoanthraquinonyl-(1")-amino)-6-chloro-s-triazine are suspended at room temperature in 50 parts of 30% sodium hydroxide, then 7.5 parts of hydrazine hydrate are added. The suspension is then heated to 100° C. and stirred for 3 hours at 100°–105° C. Then 50 parts of water are added and stirring is continued for about 1 hour at 80° C. The suspension is subsequently diluted with 300 parts of water and filtered. The filter cake is washed neutral with water and dried.

Yield: 4.6 parts of brown dye.

EXAMPLE 2

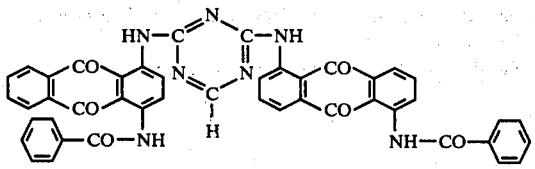

10 parts of 2-(4'-benzoylamino-anthraquinonyl-(1')-amino)-4-(5"-benzoylamino-anthraquinonyl-(1")-amino)-6-chloro-s-triazine are suspended at room temperature in 100 parts of 30% sodium hydroxide, and then 15 parts of hydrazine hydrate are added. The suspension is subsequently heated to 100° C. and stirred for 3 hours at 100°–105° C. Then 100 parts of water are added and stirring is continued for about 1 hour at 80° C. The suspension is then diluted with 500 parts of water and filtered. The filter cake is washed neutral with water and dried.

Yield: 8.5 parts of brown dye.

EXAMPLE 3

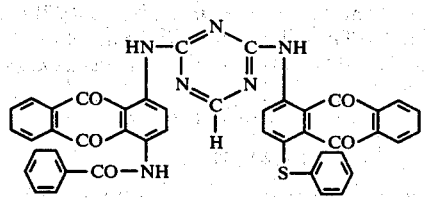

10 parts of 2-(4'-benzoylamino-anthraquinonyl)-(1')-amino)4-(4"-phenylthio-anthraquinonyl)-(1")-amino)-6-chloro-s-triazine are suspended at room temperature in 100 parts of 30% sodium hydroxide, and then 15 parts of hydrazine hydrate are added. The suspension is subsequently heated to 100° C. and stirred for 3 hours at 100°–105° C. Then 100 parts of water are added and stirring is continued for about 1 hour at 80° C. The suspension is then diluted with 500 parts of water and filtered. The filter cake is washed neutral with water and dried.

Yield: 9.6 parts of red dye.

EXAMPLE 4

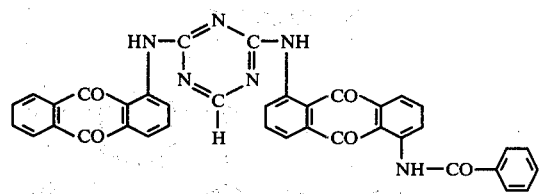

10 parts of 2-anthraquinonyl-(1')-amino-4-(5"-benzoylaminoanthraquinonyl-(1")-amino)-6-chloro-s-triazine are suspended at room temperature in 100 parts of 30% sodium hydrixide, and then 15 parts of hydrazine hydrate are added. The suspension is subsequently heated to 100° C. and stirred for 3 hours at 100°–105° C. Then 100 parts of water are added and stirring is continued for about 1 hour at 80° C. The suspension is then diluted with 500 parts of water and filtered. The filter cake is washed neutral with water and dried.

Yield: 9.5 parts of orange dye.

EXAMPLE 5

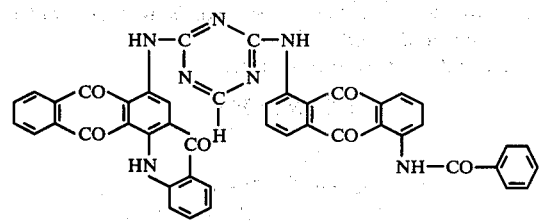

5 parts of 2-(3',4'-phthaloylacridonyl-(2')-amino)-4-(5"-benzoylamino-anthraquinonyl-(1")-amino)-6-chloro-s-triazine are suspended at room temperature in 50 parts of 30% sodium hydroxide, and then 7.5 parts of hydrazine hydrate are added. The suspension is subsequently heated to 100° C. and stirred for 3 hours at 100°–105° C. Then 50 parts of water are added and stirring is continued for about 1 hour at 80° C. The suspension is then diluted with 300 parts of water and filtered. The filter cake is washed neutral with water and dried.

Yield: 4.5 parts of olive green dye.

EXAMPLE 6

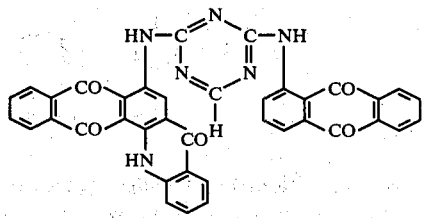

10 parts of 2-(3',4'-phthaloylacridonyl-(2')-amino)-4-anthraquinonyl-(1")-amino-6-chloro-s-triazine are suspended at room temperature in 100 parts of 30% sodium hydroxide, and then 15 parts of hydrazine hydrate are added. The suspension is subsequently heated to 100° C.

and stirred for 3 hours at 100°-105° C. Then 100 parts of water are added and stirring is continued for about 1 hour at 80° C. The suspension is then diluted with 500 parts of water and filtered. The filter cake is washed neutral with water and dried.

Yield: 9.4 parts of olive green dye.

EXAMPLE 7

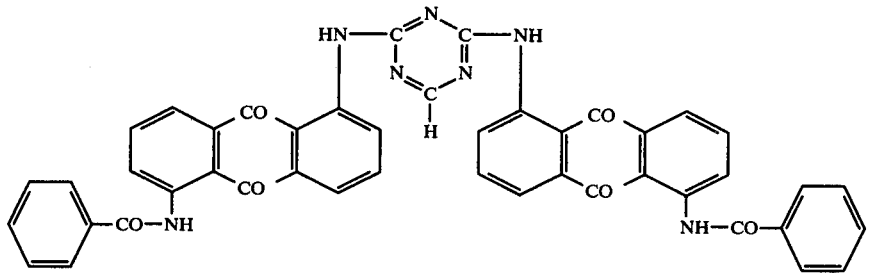

10 parts of 2,4-bis-(5'-benzoylamino-anthraquinonyl-(1')-amino)-6-chloro-s-triazine are suspended at room temperature in 100 parts of 30% sodium hydroxide, and then 15 parts of hydrazine hydrate are added. The suspension is subsequently heated to 100° C. and stirred for 3 hours at 100°-105° C. Then 100 parts of water are added and stirring is continued for about 1 hour at 80° C. The suspension is then diluted with 500 parts of water and filtered. The filter cake is washed neutral with water and dried.

Yield: 9.6 parts of orange dye.

EXAMPLE 8

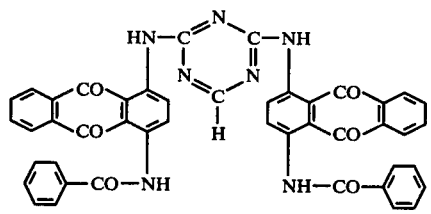

10 parts of 2,4-bis-(4'-benzoylamino-anthraquinonyl-(1')-amino)-6-chloro-s-triazine are reacted as in Example 7.

Yield: 9.5 parts of red dye.

EXAMPLE 9

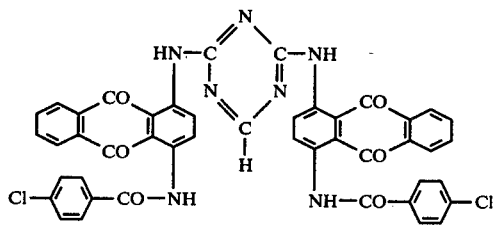

10 parts of 2,4-bis-(4'-(4''-chlorobenzoylamino)-anthraquinonyl(1')-amino)-6-chloro-s-triazine are suspended at room temperature in 100 parts of 30% sodium hydroxide, and then 15 parts of hydrazine hydrate are added. The suspension is subsequently heated to 100° C. and stirred for 3 hours at 100°-105° C. Then 100 parts of water are added and stirring is continued for about 1 hour at 80° C. The suspension is then diluted with 500 parts of water and filtered. The filter cake is washed neutral with water and dried.

Yield: 9.1 parts of red dye.

EXAMPLE 10

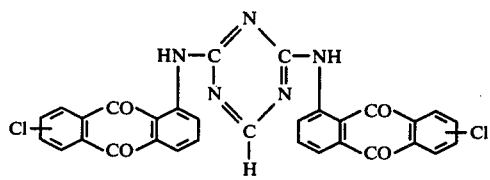

10 parts of 2,4-bis-(6'- or 7'-chloro-anthraquinonyl)-(1')-amino)-6-chloro-s-triazine are reacted as in Example 9.

Yield: 9.5 parts of yellowish orange dye.

EXAMPLE 11

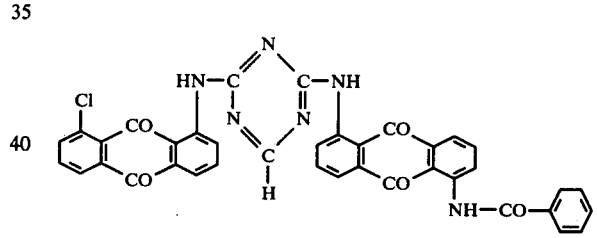

10 parts of 2-(8'-chloroanthraquinonyl-(1')-amino)-4-(5''-benzoylamino-anthraquinonyl-(1'')-amino)-6-chloro-s-triazine are suspended at room temperature in 100 parts of 30% sodium hydroxide, and then 15 parts of hydrazine hydrate are added. The suspension is subsequently heated to 100° C. and stirred for 3 hours at 100°-105° C. Then 100 parts of water are added and stirring is continued for about 1 hour at 80° C. The suspension is then diluted with 500 parts of water and filtered. The filter cake is washed neutral with water and dried.

Yield: 9.7 parts of orange dye.

EXAMPLE 12

The same end product is obtained in a yield of 4.5 parts by repeating the procedure of Example 1 using 2.5 parts instead of 7.5 parts of hydrazine hydrate.

EXAMPLE 13

The same end product is obtained in a yield of 9.5 parts by repeating the procedure of Example 2 using 80 parts of 15% potassium hydroxide instead of 100 parts of 30% sodium hydroxide and 5 parts instead of 15 parts of hydrazine hydrate.

EXAMPLE 14

The same end product is obtained in a yield of 9.5 parts by repeating the procedure of Example 4 using 80 parts of 15% sodium hydroxide and 20 parts of ethanol instead of 100 parts of 30% sodium hydroxide.

EXAMPLE 15

The same end product is obtained in a yield of 4.4 parts by repeating the procedure of Example 5 using 6 parts of hydrazinium sulfate instead of 7.5 parts of hydrazine hydrate.

EXAMPLE 16

The same end product is obtained in a yield of 9.4 parts by repeating the procedure of Example 6 using 10 parts of hydrazinium chloride instead of 15 parts of hydrazine hydrate.

EXAMPLE 17

The same end product is obtained in a yield of 9.4 parts by repeating the procedure of Example 7 using 90 parts of 10% potassium hydroxide and 10 parts of propanol instead of 100 parts of 30% sodium hydroxide.

EXAMPLE 18

The same end product is obtained in a yield of 9.5 parts by repeating the procedure of Example 17 using 10 parts of isopropanol instead of 10 parts of propanol.

EXAMPLE 19

The same end product is obtained in a yield of 9.4 parts by repeating the procedure of Example 17 using 10 parts of methanol instead of 10 parts of propanol.

In the same way as described in the preceding Examples 1 to 19, it is possible to obtain further vat dyes of the formula

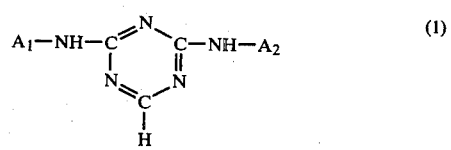

wherein $A_1$ and $A_2$ are the vattable radicals indicated in the table. The last column of the table indicates the shades obtained on cotton with the respective vat dyes by the vat dyeing process.

TABLE

| No. | $A_1$ | $A_2$ | Shade |
|---|---|---|---|
| 1 | [structure] | [structure] | yellow |
| 2 | " | [structure] | " |
| 3 | [structure] | [structure] | blue |
| 4 | [structure] | [structure] | yellow |
| 5 | " | [structure] | green |
| 6 | " | [structure] | orange |
| 7 | [structure] | [structure] | violet |

TABLE-continued

| No. | A₁ | A₂ | Shade |
|---|---|---|---|
| 8 | 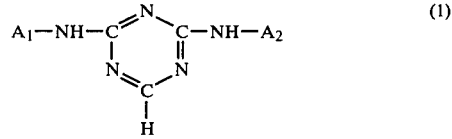 | 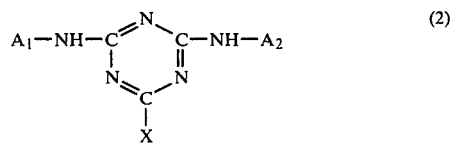 | blue |

DYEING PROCEDURE I 1 part of the dye of Example 1 is vatted at 50°–70° C. with 10 parts by volume of sodium hydroxide having a specific gravity of 36° Bé and 5 parts of sodium hydrosulfite in 200 parts of water. The above stock vat is added to a dyebath which contains in 2000 parts of water 5 parts by volume of sodium hydroxide solution with a specific gravity of 36° Bé and 3.7 parts of sodium hydrosulfite. 100 parts of cotton are put into this bath at 40° C. After 10 minutes, 15 parts of sodium chloride are added and after 20 minutes a further 15 parts are added and dyeing is performed for 45 minutes at 40° C. The cotton is squeezed out, oxidised, and finished in the usual manner. A brown dyeing is obtained.

DYEING PROCEDURE II 1 part of the dye obtained according to Example 2 and 0.5 part of CI Disperse Yellow 84 are ground wet with 2.5 parts of a 50% aqueous solution of the sodium salt of dinaphthylmethanedisulfonic acid. A dyebath is prepared with this dyestuff preparation, 2 parts of ammonium sulfate and 1000 parts of water and its pH is brought to 6.0 to 6.9 with monosodium phosphate. 100 parts of a cotton/polyester blend (67% PE) is put into this bath and the temperature is raised over the course of 45 minutes to 120°–125° C. Dyeing is performed for 60 minutes at this temperature in a closed vessel. The bath is allowed to cool to 60°–70° C. and 20 parts by volume of sodium hydroxide having a specific gravity of 36° Be and 5 parts of sodium hydrosulfite are added. After 45 minutes the fabric is squeezed, oxidised and finished in the usual manner. A yellowish brown dyeing is obtained.

PIGMENT COLOURATION 5 parts of the dye obtained in Example 7 are mixed with 95 parts of dioctyl phthalate and ground in a ball mill until the particles are smaller than 3μ. 0.8 part of this dioctyl phthalate paste is mixed with 13 parts of polyvinyl chloride, 7 parts of dioctyl phthalate and 0.1 cadmium stearate and this mixture is then rolled for 5 minutes in a two-roll mill at 140° C.

A material having an orange yellow colouration with good migration properties and good fastness to light is obtained.

COLOURATION OF LACQUERS 10 g of titanium dioxide and 2 g of the dye obtained in Example 8 are ground in a ball mill for 48 hours together with a mixture of 26.4 g of coconut alkyl resin, 24.0 g of melamine-formaldehyde resin (50% solids content), 8.8 g of ethylene glycol monomethyl ether and 28.8 g of xylene.

By spraying this lacquer on an aluminium sheet, predrying it for 30 minutes at room temperature and then stoving it for 30 minutes at 120° C., there is obtained a clear, red coating which is distinguished by good fastness to overstripe bleeding, outstanding lightfastness and good resistance to atmospheric influences while having good colour strength.

What is claimed is:

1. A process for the manufacture of vat dyes of the formula $$A_1-NH-C\underset{\underset{H}{\overset{|}{N}}\underset{C}{\diagdown}N}{\overset{\diagup N\diagdown}{\underset{|}{\overset{\diagup}{\diagdown}}}}C-NH-A_2 \quad (1)$$

wherein each of A₁ and A₂ independently is an anthrapyrimidine, anthrapyridone, anthrapyrimidone, azabenzanthrone, benzanthrone, anthrone, anthrimide, anthrimidecarbazole, isothiazoleanthrone, pyrazoleanthrone, pyrimidanthrone, quinazolineanthraquinone, oxazole-anthraquinone, thiazole-anthraquinone, oxadiazole-anthraquinone, pyrazole-anthraquinone, pyrazino-anthraquinone, anthraquinone or phthaloylacridone radical which can carry as substituents halogen atoms, alkyl, alkoxy, aryl, aryloxy, aralkyl, aralko arylamino, alkylmercapto, arylmercapto, cyano, thiocyano, acyl, acylamino, carbalkoxy, sulfonamide and carboxyamide groups, which comprises reacting compounds of the formula $$A_1-NH-C\underset{\underset{X}{\overset{|}{N}}\underset{C}{\diagdown}N}{\overset{\diagup N\diagdown}{\underset{|}{\overset{\diagup}{\diagdown}}}}C-NH-A_2 \quad (2)$$

wherein X is halogen and A₁ and A₂ are as defined for formula (1), in a basic medium with hydrazine, hydrazine hydrate, methyl hydrazine, ethyl hydrazine, phenyl hydrazine, hydrazinium chloride, hydrazinium dichloride, hydrazinium sulfate, hydrazinium bromide or benzenesulfonyl hydrazide.

2. A process according to claim 1, wherein the reaction is carried out in a mixture of water and protic solvents.

3. A process according to claim 1, wherein the reaction is carried out in aqueous solution.

4. A process according to claim 3, wherein the pH value is adjusted by addition of an alkali metal hydroxide.

5. A process according to claim 4, which comprises the use of hydrazine hydrate.

6. A process according to claim 5, wherein the starting material is a compound of the formula (2), wherein X is chlorine and each of A₁ and A₂ independently is an anthraquinone radical which is bonded in the 1- or 2-position and each of which can be substituted in the remaining positions by chlorine, benzoylamino, chlorobenzoylamino, phenylamino and phenylmercapto, or a 3,4-phthaloyl-acridone radical which is bonded in the 2- or 8-position.

7. A process according to claim 6, wherein the starting materials are compounds of the formula (2), wherein $A_1$ and $A_2$ are different radicals.

* * * * *